Figure 1A:
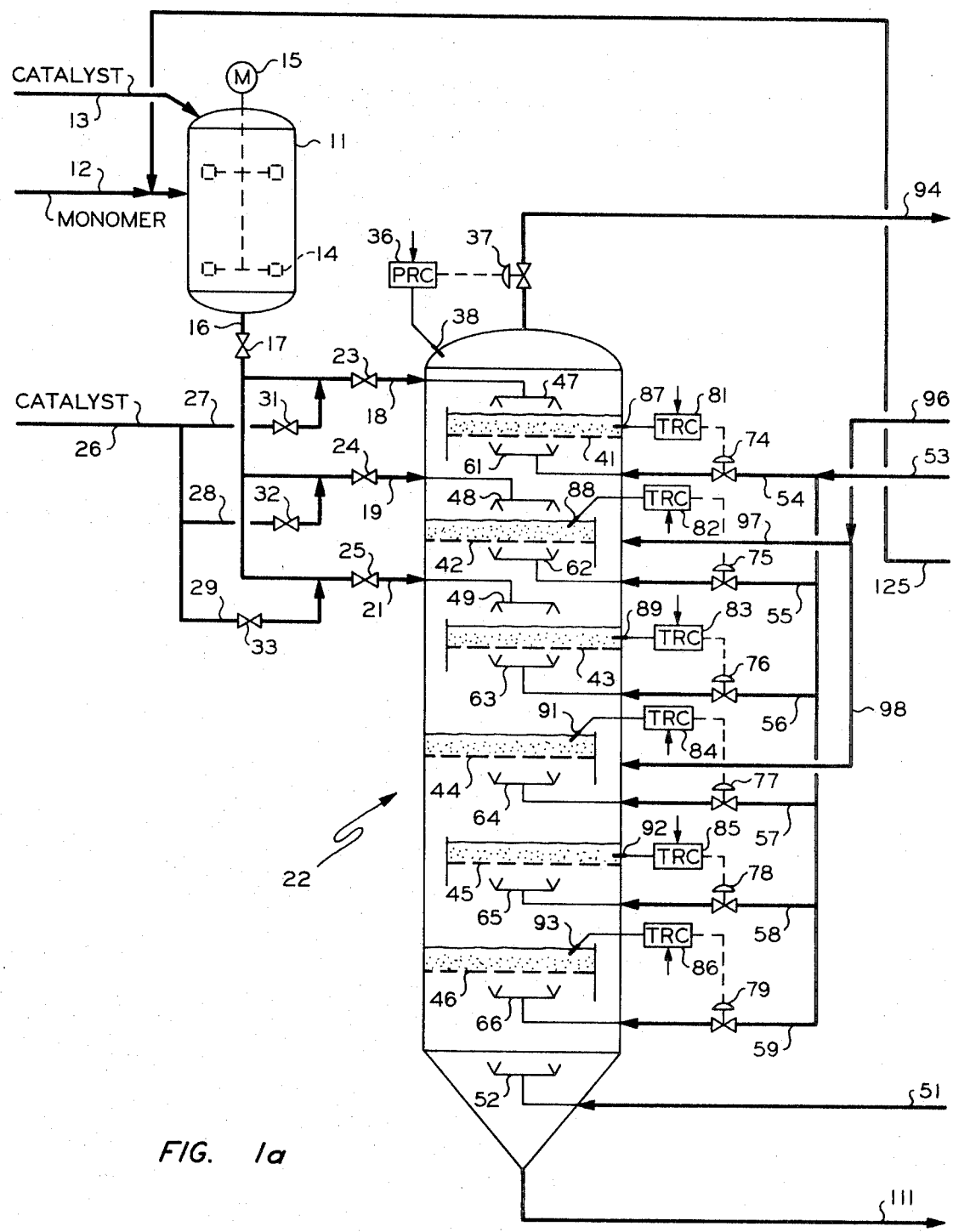
Figure 1B:
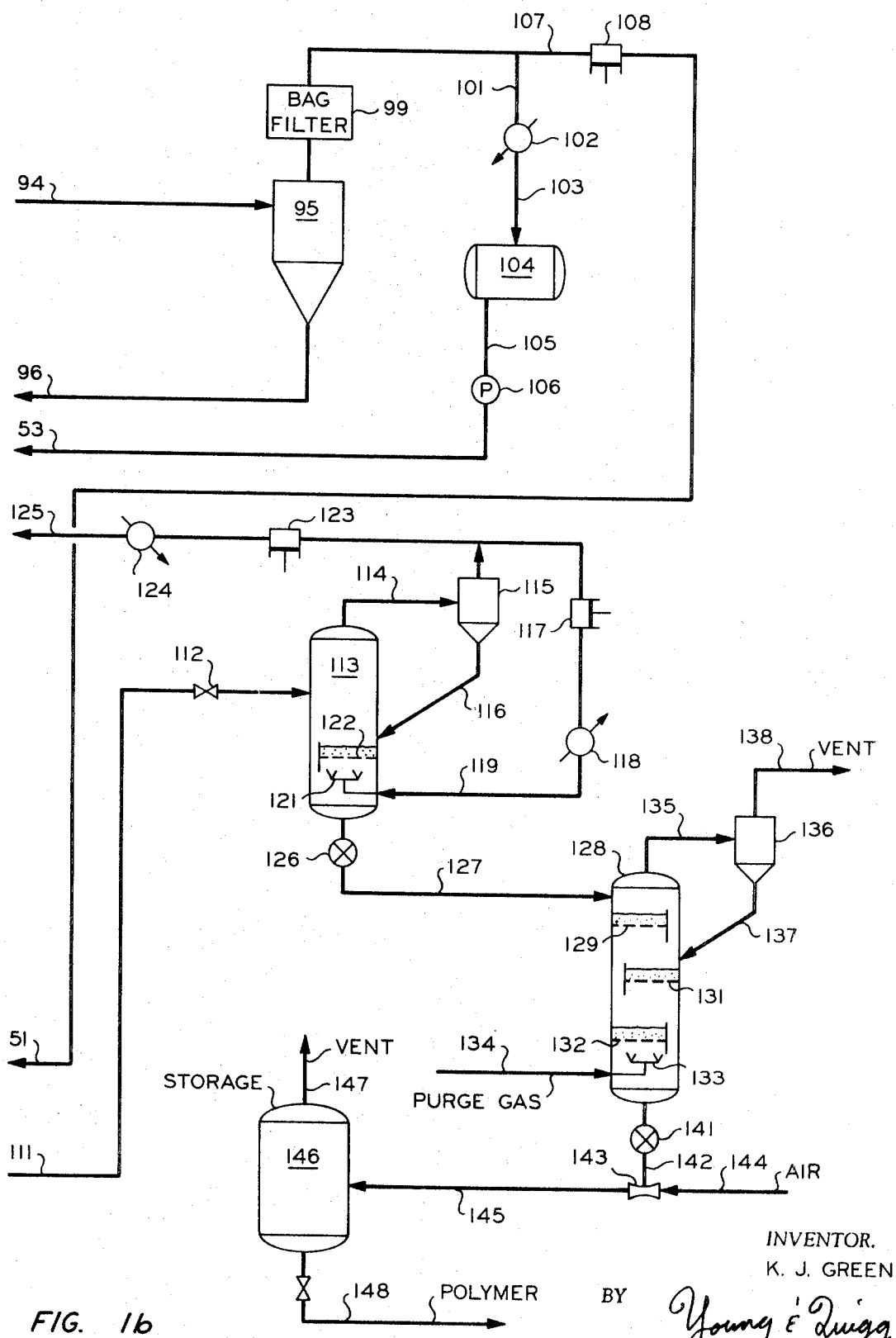

United States Patent

[11] 3,625,932

[72] Inventor Kenneth J. Green
 Bartlesville, Okla.
[21] Appl. No. 693,263
[22] Filed Dec. 26, 1967
[45] Patented Dec. 7, 1971
[73] Assignee Phillips Petroleum Company

[54] VAPOR PHASE POLYMERIZATION OF VINYL CHLORIDE IN A MULTIPLE STAGE FLUIDIZED BED REACTOR
6 Claims, 2 Drawing Figs.
[52] U.S. Cl.................................................. 260/92.8,
 260/85.5, 260/86.3, 260/87.1, 260/87.5, 260/87.5
 C, 260/87.7
[51] Int. Cl...................................................... C08f 3/30
[50] Field of Search........................................... 260/95 C,
 95, 92.8

[56] References Cited
UNITED STATES PATENTS
2,460,546 2/1949 Stephanoff.................... 260/95
2,715,117 9/1955 Baeyaert ...................... 260/92.8
FOREIGN PATENTS
940,245 10/1963 Great Britain................ 260/92.8
1,436,744 9/1966 France ......................... 260/92.8
OTHER REFERENCES
Mead, W. J., The Encyclopedia of Chemical Process Equipment, 1964 Reinhold Publishing Corporation, New York pp. 235- 239.

Primary Examiner—Joseph L. Schofer
Assistant Examiner—John A. Donahue, Jr.
Attorney—Young and Quigg ABSTRACT: Vinyl chloride, alone or with a suitable comonomer, is continuously polymerized under liquid phase bulk conditions in an agitated reactor to a solid polymer content of about 15 weight percent polymer. A portion of the reaction effluent is continuously or periodically withdrawn from the agitated reactor and flashed into a multiple stage gas-phase fluidized bed reactor wherein monomer is employed as the fluidizing gas. Monomer gas is withdrawn from the fluidized bed reactor and a portion thereof is reintroduced into the fluidized bed reactor as the fluidizing gas. An additional portion of the withdrawn monomer gas is condensed and flashed into one or more of the stages within the fluidized bed reactor at a rate responsive to the temperature of the respective stage, thereby removing heat of reaction. The fluidized bed reactor is provided with a plurality of perforated trays with or without downcomers to maintain the corresponding plurality of fluidized beds of polymer particles. A polymerstream is withdrawn from the fluidized bed reactor and passed to a fluidized bed flash tank. Polymer containing only a small amount of monomer is withdrawn from the flash tank and introduced into a multiple stage fluidized bed purge tank with the fluidizing gas being a purge gas.

INVENTOR.
K. J. GREEN

VAPOR PHASE POLYMERIZATION OF VINYL CHLORIDE IN A MULTIPLE STAGE FLUIDIZED BED REACTOR

This invention relates to a method and apparatus for the polymerization of vinyl chloride, alone or with suitable comonomers under bulk conditions, that is, in the absence of any substantial amount of solvents or diluents. Considerable difficulties have been encountered in the bulk polymerization of vinyl chloride in the liquid phase. One system which avoids many of these difficulties utilizes a liquid phase agitated reactor and a gas fluidized bed reactor in series. In such a system it is often desirable to utilize the liquid phase reactor to produce seed polymer which acts as a solid support for any catalyst remaining from the first reactor and additional catalyst introduced into the fluidized bed reactor. However, the utilization of a single stage fluidized bed reactor permits the feed charged to be substantially instantaneously admixed with the entire reaction mixture contained in the fluidized bed reactor. This results in the withdrawal of unused or only partially utilized catalyst with the polymer product stream. This bypassing of catalyst through the reactor increases catalyst cost and prevents the achievement of the desired productivity of polymer per pound of catalyst. Furthermore, bypassed active catalyst can cause a continuation of the polymerization in the monomer recovery system, resulting in a fouling of the equipment. In addition, the utilization of a single stage fluidized bed reactor results in a large variation in the particle size of the polymer product. This results from a portion of the polymer fines or seed particles being bypassed through the reactor while a portion of the larger polymer particles remain in the reactor for extended lengths of time to produce undesirably large particles.

Accordingly, it is desirable to provide an improved fluidized bed reactor for the polymerization of vinyl chloride. It is an object of the invention to provide a multiple stage fluidized bed reactor to maintain a more uniform residence time of both catalyst and polymer particles within the fluidized bed reactor. Another object of the invention is to provide a vinyl chloride polymer product having a more uniform particle size. Yet another object of the invention is to increase the productivity of polymer per pound of catalyst in a fluidized bed reactor. Yet another object of the invention is to provide a means for controlling temperature in a multiple stage fluidized reactor.

Other objects, aspects and advantages of the invention will be apparent from a study of the specification, the drawings and the appended claims to the invention.

In accordance with the present invention, the disadvantages of the single stage fluidized bed reactor are avoided and the preceding objects are achieved through the utilization of a fluidized bed reactor containing a plurality of perforated trays with or without downcomers. Gaseous monomer is introduced into the lower portion of the fluidized bed reactor to serve as the fluidizing medium while liquid monomer is introduced into one or more of the fluidized bed stages within the reactor wherein it flashes, thus removing heat of reaction to control the temperature of the respective fluidized bed stage. Seed polymer, catalyst and monomer are introduced into one or more of the upper stages in the reactor. A polymer product stream is withdrawn from a lower portion of the reactor and passed through a fluidized bed flash tank and through a multiple stage fluidized bed purge column to recover a polymer product substantially free of monomer.

Referring now to the drawing, there is illustrated a schematic representation of a polymerization system embodying the present invention. The liquid phase bulk polymerization is conducted in agitated reactor 11. While reactor 11 is illustrated as a stirred pot reactor, any known type of agitated liquid phase reactor can be utilized, for example a loop reactor. Monomer is introduced into reactor 11 by way of conduit 12. For sake of simplicity, the system will be described in terms of the homopolymerization of vinyl chloride, but the invention is also applicable to the copolymerization of vinyl chloride and at least one other suitable comonomer wherein the vinyl chloride preferably constitutes at least 60 weight percent of the total monomers. Examples of suitable comonomers include vinylidene derivatives, especially vinylidene chloride, vinyl esters of carboxylic acids, for example, vinyl acetate, vinyl propionate, vinyl butyrate, vinyl benzoate, esters of unsaturated acids, e.g., methyl acrylate, ethyl acrylate, butyl acrylate, allyl acrylate and the corresponding esters of methacrylic acids; vinyl aromatic compounds, e.g., styrene, orthochloro styrene, p-chlorostyrene, 2,5-dichlorostyrene, 2,4-dichlorostyrene, p-ethyl styrene, divinyl benzene, vinyl naphthalene, alpha-methyl styrene, dienes such as butadienes, chloroprenes, amides, such as acrylic acid amide, nitriles such as acrylic acid nitrile, esters of alpha-beta unsaturated carboxylic acids, e.g., the methyl, ethyl, propyl, butyl, amyl, hexyl, heptyl, octyl, allyl, methallyl and phenyl esters of maleic, itaconic, fumeric acids, monoolefins such as ethylene, propylene, butene, pentene, and hexene, and combinations thereof. Catalyst, or initiator, is introduced into reactor 11 by way of conduit 13. While any known catalyst for the polymerization of vinyl chloride can be utilized, the present preferred catalyst is a free radical precursor. One group of compounds which are particularly suitable is the hexahalogen ethanes which are characterized by the following structure:

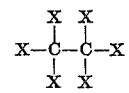

wherein each X is halogen selected from the group consisting of fluorine, chlorine, bromine, and iodine. Another group of compounds which are suitable for use as free radical precursors are peroxides having the structure:

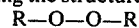

wherein each R is selected from the group consisting of alkyl, cycloalkyl, aryl, alkaryl, aralkyl, and acyl radicals containing from one to 15 carbon atoms. The dialkyl peroxy dicarbonates, represented by the formula:

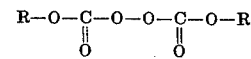

wherein each R is an alkyl group containing from one to six carbon atoms, have been found to be particularly useful, with diisopropyl peroxy dicarbonate being presently preferred because of its stability. Specific examples include hexachloroethane, 1,1,1-tribromo-2,2,2-trichloroethane, 1,1-dichloro-1,2,2,2-tetrafluoroethane, 1,1,1,2,2-pentafluoro-2-iodoethane, dimethyl peroxide, methyl ethyl peroxide, dicyclohexyl peroxide, diphenyl peroxide, bis(alpha, alpha-diisopropyl-4-ethylbenzyl) peroxide, cyclohexylbenzene hydroperoxide, diisopropyl peroxy dicarbonate, isobutyryl peroxide, diazoaminobenzene, and the like. In fact, any known free radical precursor, many of which are known to the industry, can be utilized. Suitable additional free radical precursors are listed, for example, in the Faraday Society Symposium on Free Radicals, London, 1953, and in the book *Free Radicals* by Ingram, Academic Press, Inc., New York, 1958.

The polymerization mixture comprising monomer, catalyst, and solid polymer particles is circulated by agitator 14 which is powered by motor 15. While the reaction in reactor 11 can be conducted in the complete absence of a solvent or diluent, a small amount of diluent can be employed. Generally, such diluent would constitute less than 5 weight percent of the charge to the reactor and should be at least partially miscible with the monomer but not a solvent for the polymer. Examples of such diluents include alcohols such as methanol, ethanol, and propanol, and alkanes having from three to 12 carbon atoms per molecule such as propane, butane, isopentane, exane, octane, dodecane, cycloalkanes having from three to 12 carbon atoms per molecule such as cyclopropane, cyclohexane, cyclododecane, and ethylcyclopropane, and aromatics having from six to 12 carbon atoms per molecule such as benzene, toluene, para-xylene, and hexamethylbenzene, and combinations thereof. The temperature and pressure in reactor 11 are selected to maintain the monomer in the liquid phase and will generally be in the range of about 100° to about 150° F. and about 75 to about 150 p.s.i.a., respectively. Reactor 11 is provided with a polymer product takeoff conduit 16 containing a valve 17. Valve 17 is manipulated continuously or periodically to withdraw a portion of the reaction mixture from reactor 11 to maintain the concentration of solid polymer particles in reactor 11 less than 15 weight percent, thus maintaining a flowable slurry. The thus withdrawn reaction effluent is passed through conduits 18, 19 and 21 into the upper three stages of multiple stage fluidized bed reactor 22. Conduits 18, 19 and 21 are provided with valves 23, 24 and 25, respectively, to regulate the rate of flow of the reaction mixture through the respective conduits. Fresh catalyst from conduit 26 is passed through conduits 27, 28 and 29 into conduits 18, 19 and 21, respectively. Conduits 27, 28 and 29 are provided with valves 31, 32 and 33, respectively, for the regulation of the flow rate of catalyst through the respective conduit.

Reactor 22 is provided with a suitable plurality of stages through the utilization of horizontal perforated trays 41, 42, 43, 44, 45 and 46. While each of the perforated trays can extend completely across the cross-sectional area of reactor 22, i.e., have no downcomer, it is presently preferred that each of the trays be provided with a downcomer. Conduits 18, 19 and 21 are connected to distribution rings 47, 48 and 49 located above the fluidized beds on trays 41, 42 and 43, respectively. Distribution rings 47, 48 and 49 are preferably provided with downwardly directed outlets or nozzles. Gaseous monomer is passed through conduit 51 to distribution ring 52 located in the lower portion of reactor 22 below tray 46. Liquid monomer from conduit 53 passes through conduits 54, 55, 56, 57, 58 and 59 to distribution rings 61, 62, 63, 64, 65 and 66 located immediately below trays 41, 42, 43, 44, 45 and 46, respectively, and in the vapor space above the next lower fluidized bed, if any. The pressure and temperature within reactor 22 is such that the liquid monomer introduced through distribution rings 61 through 66 vaporizes immediately, thus absorbing large amounts of heat of reaction. The thus vaporized monomer, together with the gaseous monomer from conduit 51, serve to fluidize the beds of polymer particles on trays 41–46. Distribution rings 52 and 61–66 can be provided with upwardly directed openings or nozzles. Valves 74, 75, 76, 77, 78 and 79 are located in conduits 54, 55, 56, 57, 58 and 59, respectively, for the regulation of the flow of liquid monomer through the respective conduit. Valves 74–79 are manipulated by the respective use of temperature recorder controllers 81–86 responsive to a comparison of the controller setpoint representing the desired temperature and the actual temperature of the fluidized beds on the respective one of trays 41–46 as indicated by the corresponding temperature sensors 87, 88, 89, 91, 92 and 93. The rate of flow of fluidizing gas upwardly through reactor 22 will generally be in the range of about 0.1 to about 0.4 foot per second depending upon desired particle size of the polymer. The pressure and temperature in reactor 22 will generally be in the range of about 60 to about 150 p.s.i.a. and about 100° to about 150° F., respectively. While a temperature differential could be maintained between adjacent beds in reactor 22, it is presently preferred that the temperature throughout reactor 22 be maintained substantially the same. The trays 41–46 will generally be spaced apart by a distance in the range of about 1 to about 6 feet. If used, a downcomer weir for each tray will extend above the respective tray approximately one-third to one-half of the distance between adjacent trays while the downcomer will extend below the respective tray approximately one-third to three-fourths of the distance between adjacent trays. The reactor can contain from five to 10 trays to provide a polymer residence time in the range of 1 to about 3 hours. While the temperature of the gaseous monomer in conduit 51 could be varied to aid in the control of the temperature in reactor 22, it is presently preferred that the fluidizing gaseous monomer in conduit 51 be maintained substantially at the desired reactor temperature and the temperature control be effected through the variation of the amount of liquid monomer introduced below each tray. The pressure in reactor 22 is controlled by pressure recorder controller 36 which manipulates valve 37 located in conduit 94 responsive to a comparison of a setpoint representing the desired pressure and the actual pressure as indicated by pressure sensor 38.

A gaseous monomer stream, containing entrained polymer fines, is passed by way of conduit 94 from the overhead portion of reactor 22 into cyclone separator 95. Solid polymer particles are withdrawn from separator 95 through conduit 96 and are reintroduced onto trays 43 and 45 by way of conduits 97 and 98, respectively. Gaseous monomer is withdrawn from cyclone separator 95 and passed through bag filter 99. A portion of the gaseous monomer from filter 99 is passed through conduit 101 to indirect heat exchanger 102, wherein the monomer is condensed. The liquid monomer condensate from exchanger 102 passes through accumulator 103 into accumulator 104. Liquid monomer is withdrawn from accumulator 104 and passed by way of conduit 105 and pump 106 to conduit 53. The remainder of the gaseous monomer from filter 99 is passed through conduit 107 to compressor 108. The compressed gaseous monomer is passed through conduit 51 to distribution ring 52.

Polymer particles, containing absorbed liquid and gaseous monomer, are withdrawn from reactor 22 and passed by way of conduit 111 and expansion valve 112 into fluidized bed flash column 113. Gaseous monomer, containing entrained polymer fines, is withdrawn from the upper portion of column 113 and passed by way of conduit 114 to cyclone separator 115. Column 113 can be operated at atmospheric, subatmospheric or superatmospheric pressure, but generally will have a pressure in the range of about 15 to about 25 p.s.i.a. at a temperature in the range of about 150° to about 200° F.

Polymer particle fines from cyclone separator 115 are passed through conduit 116 to flash tank 113. A portion of the gaseous monomer from separator 115 is compressed in compressor 117. The compressed gaseous monomer is heated in indirect heat exchanger 118 and passed through conduit 119 to distribution ring 121, located in column 113 below perforated tray 122 as the fluidizing gas for the bed of polymer particles on tray 122. The heat transfer in exchanger 118 can be varied to maintain a desired elevated temperature in column 113. The elevated temperature increases the amount of monomer vaporized in column 113. The remainder of the gaseous monomer from separator 115 is passed to compressor 123. The compressed gaseous monomer is then passed to indirect heat exchanger 124 wherein the monomer is condensed. The resulting liquid monomer is passed by way of conduit 125 to monomer feed conduit 12.

Polymer particles containing a reduced amount of monomer are withdrawn from the lower portion of column 113 and passed by way of star valve 126 and conduit 127 to the upper stage of multiple stage fluidized bed purge column 128. Column 128 is provided with at least three perforated trays 129, 131 and 132 and a fluidizing gas distribution ring 133 located below the lowest tray 132. Purge gas is passed by way of conduit 134 to distribution ring 133 as the fluidizing gas. Suitable purge gases include nitrogen, carbon dioxide, and the like. An overhead gas stream, comprising purge gas, gaseous monomer and entrained polymer particles, is withdrawn from the upper portion of column 128 and passed through conduit 135 to cyclone separator 136. Polymer particles from separator 136 are returned to column 128 by way of conduit 137, while the gases are passed from separator 136 through conduit 138 to a vent or means for recovery of the gaseous monomer. Column 128 can be operated at atmospheric, superatmospheric or subatmospheric pressure, but is preferably operated substantially at atmospheric pressure. The purge gas can be at atmospheric temperature, but is preferably heated above atmospheric temperature to increase monomer removal.

Polymer particles, substantially free of monomer, are withdrawn from column 128 by way of star valve 141 and conduit 142 and introduced into air transportation stream 143 by way of eductor 144. The air fluidized polymer particle stream is passed through conduit 145 to storage tank 146. The transporting air is vented from tank 146 by way of conduit 147, while polymer particles are withdrawn therefrom, as desired, by way of conduit 148.

The following example is presented in further illustration of the invention and should not be construed in undue limitation thereof.

| Stream Number | 13 | 12 | 16 | 125 | 26 | 94 | 53 | 51 | 96 | 111 | 114 | 116 | 119 | 127 | 134 | 138 | 142 |
|---|---|---|---|---|---|---|---|---|---|---|---|---|---|---|---|---|---|
| Component, lb./hr | | | | | | | | | | | | | | | | | |
| Vinyl chloride | | 7,200 | 8,633 | 1,570 | | 165,800 | 37,800 | 128,000 | | 1,850 | 151,570 | | 150,000 | 280 | | 142 | |
| Diisopropyl peroxydicarbonate | 1.0 | | 1.0 | | 4 | | | | | | | | | 6,920 | | | 6,920 |
| Nitrogen | | | | | | | | | | | | | | | 664 | 664 | |
| Pentane | 2.0 | 142 | 886 | 742 | 6 | 3,250 | 750 | 2,500 | | 892 | 3,150 | | 2,408 | 150 | | 150 | |
| Polyvinyl chloride | | | 137 | | | 200 | | | 200 | 6,920 | 200 | 200 | | | | | |
| Total | 3.0 | 7,342 | 9,657 | 2,312 | 10 | 169,250 | 38,550 | 130,500 | 200 | 9,662 | 154,920 | 200 | 152,408 | 7,350 | 664 | 956 | 6,920 |

While trays 41–46, 122, and 129–132 have been described as perforated trays, any suitable type of tray can be utilized, for example, bubble cap trays. For purposes of simplicity, many mechanical details such as conventional temperature control systems have been omitted. Thus reactor 11 can be provided with a heat exchanger jacket and/or internal heat exchange coils; column 113 can be provided with a heating jacket and/or can be in the form of an agitated bed with heating means in the agitator. While the drawing has been described in terms of the homopolymerization of vinyl chloride, it is also applicable to the copolymerization of vinyl chloride and at least one suitable comonomer. In the copolymerization process as in the homopolymerization, all of the fresh monomer feed can be introduced into reactor 11, or a portion into reactor 11 and the remainder into reactor 22. In the copolymerization process one or more comonomers can be introduced into reactor 11 and the other comonomer can be introduced into reactor 22, or each of the comonomers can be added to each reactor with the ratio of comonomer being different for the two reactors. While the seed polymer particles can be produced in reactor 11, as illustrated, it is only necessary that the feed to reactor 22 include monomer, catalyst and seed polymer particles can be produced by grinding granular polymer to give the desired mesh size for the seed, which will generally be in the range of about 50 to about 200 VS mesh.

Reasonable variations and modifications are possible within the scope of the foregoing disclosure, the drawing and the appended claims to the invention.

I claim:

1. A process for the polymerization of monomer selected from the group consisting of vinyl chloride and combinations of vinyl chloride with at least one suitable comonomer wherein the vinyl chloride constitutes at least 60 weight percent of the total comonomers, which comprises introducing at least a portion of said monomer and at least a portion of said catalyst into a liquid phase agitated reaction zone; maintaining said liquid phase agitated reaction zone under polymerization conditions; withdrawing from said liquid phase agitated reaction zone a reaction effluent stream of seed polymer particles, catalyst and monomer; maintaining under suitable polymerization conditions, at which said monomer is in the gas phase, a plurality of gas fluidized beds of polymer particles connected in series wherein polymer particles pass from the top bed in the series to the bottom bed in the series and the fluidizing gas passes from said bottom bed in the series to said top bed in the series; introducing into at least one of the upper beds in said series said reaction effluent stream; withdrawing a vaporous stream from the overhead of said top bed; compressing a first portion of said vaporous stream to obtain a first additional portion of said monomer in the gas phase; condensing a second portion of said vaporous stream to obtain a second additional portion of said monomer in the liquid phase; utilizing said first additional portion of said monomer in the gas phase as at least a portion of the fluidizing gas for said beds; introducing said second additional portion of said monomer in the liquid phase into each of a plurality of said beds at a rate representative of the temperature in the respective one of said beds; and withdrawing polymer particles from said bottom bed.

2. A process in accordance with claim 1 wherein said reaction effluent stream is withdrawn from said liquid phase agitated reaction zone at a rate to maintain the polymer content in said liquid phase reaction zone less than a predetermined amount.

3. A process in accordance with claim 2 further comprising passing the polymer particles from said bottom bed into a flash zone to flash a portion of the monomer associated therewith, withdrawing from the overhead of said flash zone an overhead stream of gaseous monomer and withdrawing from the lower portion of said flash zone polymer particles having a reduced amount of monomer associated therewith.

4. A process in accordance with claim 3 wherein said flash zone contains a fluidized bed, and further comprising compressing and heating a portion of said overhead stream from said flash zone, and introducing the resulting heated compressed gas into said flash zone as the fluidizing gas for said fluidized bed in said flash zone.

5. A process in accordance with claim 3 further comprising passing the polymer particles withdrawn from said flash zone into a multiple stage fluidized bed purge zone, passing a purge gas through each of the stages in said purge zone, and withdrawing from said purge zone polymer particles substantially free of monomer.

6. A process in accordance with claim 3 wherein said monomer is vinyl chloride, wherein said polymerization conditions in said liquid phase agitated reaction zone comprise a pressure in the range of about 75 to about 150 p.s.i.a. at a temperature in the range of about 100° to about 150° F., said predetermined amount is 15 weight percent, said reaction conditions in said plurality of gas fluidized beds comprise a pressure in the range of about 60 to about 150 p.s.i.a. at a temperature in the range of about 100° to about 150° F., and the temperature in each of said plurality of gas fluidized beds is substantially the same.

* * * * *